United States Patent
Rao

(10) Patent No.: US 6,606,415 B1
(45) Date of Patent: Aug. 12, 2003

(54) FEEDBACK CONTROL FOR HYBRID COMPRESSION

(75) Inventor: Srinivas P. Rao, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/397,977

(22) Filed: Sep. 16, 1999

Related U.S. Application Data

(60) Provisional application No. 60/100,477, filed on Sep. 16, 1998.

(51) Int. Cl.$^7$ .............................. G06K 9/36; G06K 9/46
(52) U.S. Cl. ........................ 382/239; 382/228; 382/251
(58) Field of Search ................................ 382/176, 224, 382/228, 232, 238, 239, 243–246, 248, 250, 251; 375/240.02, 240.08, 240.2, 240.21, 240.24; 348/420.1, 403.1, 404.1; 358/426.02

(56) References Cited

U.S. PATENT DOCUMENTS 5,379,355 A * 1/1995 Allen .......................... 375/241
5,414,527 A * 5/1995 Koshi et al. ............ 375/240.24
6,330,363 B1 * 12/2001 Accad ......................... 382/232

* cited by examiner

Primary Examiner—Timothy M. Johnson
(74) Attorney, Agent, or Firm—Robert D. Marshall, Jr.; W. James Brady, III; Frederick J. Telecky, Jr.

(57) ABSTRACT

A closed loop feedback system adaptively controls the compression ratio in a Raster Image Processor. The image content is analyzed in real time, and rasterized bitmap is compressed to a sufficient degree to fit into the available frame buffer. This compression may be done by a variety of algorithms depending on image content. The compression ratio is adjusted on the fly by changing the method of compression, more aggressive or selective quantizing of the image, or by a decimation of parts of the image. The algorithms show will execute very efficiently on a Texas Instruments TMS320C82 multiprocessing DSP. Several methods of implementation on the TMS320C82 are shown.

13 Claims, 3 Drawing Sheets

COMPRESSOR — 301

EXPANDER — 302

FEEDBACK CONTROL FOR HYBRID COMPRESSION

This application claims priority under 35 USC §119(e)(1) of Provisional Application No. 60/100,477, filed Sep. 16, 1998.

TECHNICAL FIELD OF INVENTION

This invention relates in general to the field of Raster Image Processing, and more specifically to a feedback approach that automatically controls the image compression ratios required to minimize the memory requirements for Raster Image Processors employed in generating a bitmap representation of a composite page.

BACKGROUND OF INVENTION

When printing a document, the page to be printed is typically composed electronically using software like QuarkXpress, Framemaker, etc. Internally the page is stored in a vector based graphical representation by these composition tools. Before display or printing, the vector-based representation of the page is converted to a bitmap representation at the desired resolution by a process called Rasterisation.

This conversion process can usually be divided into two stages: interpretation and rendering. Interpretation is the process where the original page description is reduced to a series of drawing primitives called the display list. Rendering is the process where these drawing primitives are converted to a bitmap in the frame buffer.

At high resolutions, a significant amount of memory is required to store this bitmap image. As an example, an 8.5"×11" page at a resolution of 600 Dots per Inch (dpi), 8 bits/pixel and 4 color planes will require 128 MB of frame buffer memory.

If the available frame buffer memory is less than this limit, an alternate strategy must be followed. The page is divided into smaller portions or bands, with the band size being determined by the available frame buffer memory. Each band is then rendered to bitmap form and passed on to the exposure, printing or display module to make space for the subsequent bands.

Since the exposure module has to be fed with bitmap data at regular intervals, each band must be rendered in a predefined time. As rendering is computationally intensive, such real-time rendering may not be possible for some complex bands. If this is the case, each band must be pre-rendered, compressed and stored. After all the bands have been processed and compressed, they are decompressed in real time and fed to the exposure module.

In some cases real-time rendering may not be possible even though the bands are not complex. If the available memory is limited, there may not be sufficient room to store the original display list and other information required for rendering the page.

There are various methods that may be employed to compress the rendered image. To maintain maximum image quality, a lossless or low loss method is preferred. Unfortunately, the amount of compression attainable with most of these methods is highly dependent on the page content, and some pages will compress much more than others. Since the amount of memory and the page size are fixed, a method must be found to guarantee that all pages can be rendered and printed in real time.

SUMMARY OF THE INVENTION

This invention shows a feedback algorithm designed to select and enforce a target compression ratio that will guarantee that the system will be capable of rendering any input page, irrespective of the complexity, within the available memory limitations.

The feedback methods shown apply to a block-based, hybrid compression method. The image to be rendered is first segmented into non-overlapping blocks of pixels. Each block is then classified as Solids, Text (saturated or unsaturated), or image areas. The compression method applied to each block is then selected based on the class of the block, according to the following criteria:

Differential Pulse Code Modulation (DPCM) is used to code solids

Block Truncation Coding (BTC) is used for text

Image blocks may be coded using DPCM, DCT (Discrete Cosine Transform), BTC or a combination of these methods. The image blocks may also be decimated previous to coding.

Runs of repeating solids are compressed using run length coding.

The highest compression ratio is achieved using DPCM on blocks classified as solids. Accordingly, adjusting the threshold used in classifying the blocks as solids will modulate the effective compression ratio, and by increasing the number of solids the compression ratio is also increased.

If the target compression ratio is not met by using the feedback mechanism, a fall back strategy may be employed. In this case, the entire band must be decimated by 2:1, followed by BTC. Since decimated bands do not visibly stand out from other bands that have not been decimated, this decision may be made on a band by band basis.

The feedback compression approach shown can be very efficiently implemented on a parallel processor such as the Texas Instruments TMS320C80 family.

BRIEF DESCRIPTION OF THE DRAWINGS

These and other aspects of this invention are illustrated in the drawings, in which.

DETAILED DESCRIPTION OF THE INVENTION

There are a number of ways to derive a feedback control parameter of a block within the image. In essence, they all attempt to measure the variation, or activity within the block. Of these, it can be experimentally proven that the most suitable is what we call alpha_threshold. Alpha is the average absolute variation from the mean within the block. Another method that may be used is the average squared variation from the mean (the classical variance or sigma). In describing this invention, the alpha_threshold will be used.

Figure 1:
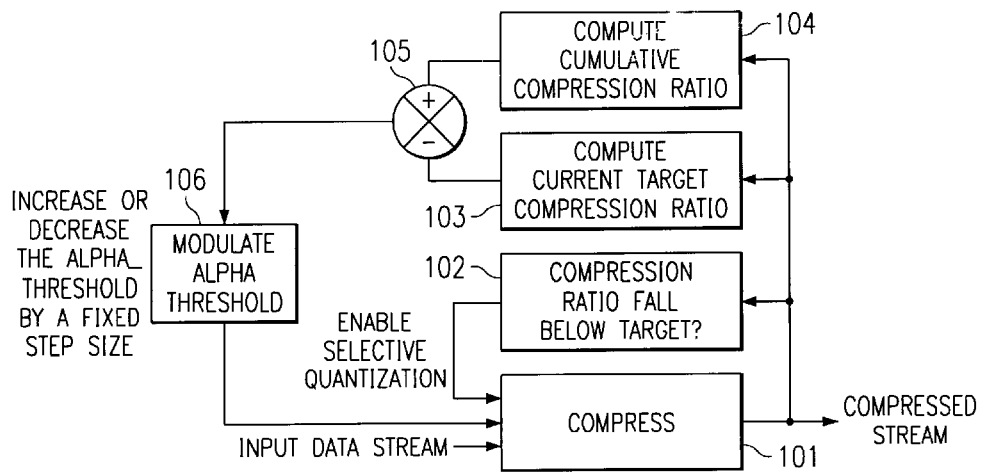
FIG. 1 is a block diagram of one implementation of the invention.

FIG. 1 shows one way to implement the feedback mechanism. The input bitstream representing one image block is supplied to compression processing block 101. The data is compressed according to its class (solid, image, and text) and the cumulative compression ratio within the current page is computed in computational block 104. Block 103 then computes the target compression ratio for the page. The two are compared in block 105, and the alpha_threshold is adjusted in block 106. The resulting alpha threshold is then used to adjust the compression ratio in processing block 101 by shifting the decision point between classifying a block solid or image. If the target compression ratio can not be attained as detected by block 102, more aggressive, selective quantization and/or decimation is implemented.

The following pseudo-code represents this feedback process.

define MIN_ALPHA 1
    #define MAX_ALPHA 15
    #define DELTA_ALPHA 3
    /*MIN_ALPHA and MAX_ALPHA define the limits of the alpha_threshold DELTA_ALPHA defines the amount by which the alpha_threshold can be varied in a single step*/
    IF (cur_targetCR>cum_CR)
    THEN (cur_alpha_threshold=cur_alpha_threshold+DELTA_ALPHA
ELSE IF ((cum_CR>1.15*cur_target_CR) && (cur_blk_row<30)
    THEN cur_alpha=cur_alpha–(DELTA_ALPHA/2)
IF (cur_alpha>MAX_ALPHA) THEN cur_alpha=MAX_ALPHA
IF (cur_alpha<MIN_ALPHA) THEN cur_alpha=MIN_ALPHA It has been experimentally determined that over shooting the target compression ratio by 15% is permissible. The code also shows that alpha_threshold is only adjusted within the range of MIN_ALPHA and MAX_ALPHA, and is clipped to fall within this range. It has also been determined by visual observation of the page that the blocks near the right margin should not be compressed as aggressively as the rest of the page.

Calculating cum_CR (cumulative compression ratio) and cur_targetCR (current target compression ratio) is very computationally intensive. The computation can be reduced by the following simplification:

We know the total area (size) of the band buffer, and therefore the maximum permissible length of the compressed bit stream. This also gives us the maximum permissible length of the compressed bit stream on a per_block_row basis (COMP_BLOCK_ROW_SIZE). We also know the size of the compressed bit stream (COMP_BIT_STREAM_SIZE). Accordingly, alpha_threshold may be now modulated as shown in the following pseudocode:

Rem_comp_bits=((BAND_AREA * 8)/16)–comp_bit_stream_size /*BAND_AREA is the size of the band (in bytes) being compressed and 16 is the initial target compression ratio. The multiply by 8 is to convert this into bits. Rem_comp_bits is the remaining size of the compressed bit stream, while comp_bit_stream_size is the maximum allowed compressed bit stream size.*/
    rem_comp_bits_per_block_row=rem_comp_bits/rem_block_rows /*rem_block_rows is the remaining number of block rows for the band being compressed.*/
    IF (rem_comp_bits_per_block_row<COMP_BLOCK_ROW_SIZE) THEN cur_alpha=cur_alpha+DELTA_ALPHA
    ELSE IF ((rem_comp_bits_per_block_row>COMP_BLOCK_ROW_SIZE+OVERSHOOT) && (cur_block_row<30)) THEN cur_alpha=cur_alpha–DELTA_ALPHA/2 /*OVERSHOOT is a predefined constant. */
    IF (cur_alpha>MAX_ALPHA) THEN cur_alpha=MAX_ALPHA
    IF (cur_alpha<MIN_ALPHA) THEN cur_alpha=MIN_ALPHA Since insufficient compression may cause a buffer overflow and a fatal error, the above algorithm will increase the compression ratio by DELTA/ALPHA, but will decrease it by DELTA/ALPHA/2 with each correction step. This will allow the algorithm to overshoot, but will decrease the probability of an undershoot resulting in insufficient compression.

The feedback compression control may also be implemented by using the following alternate method.

Figure 2:
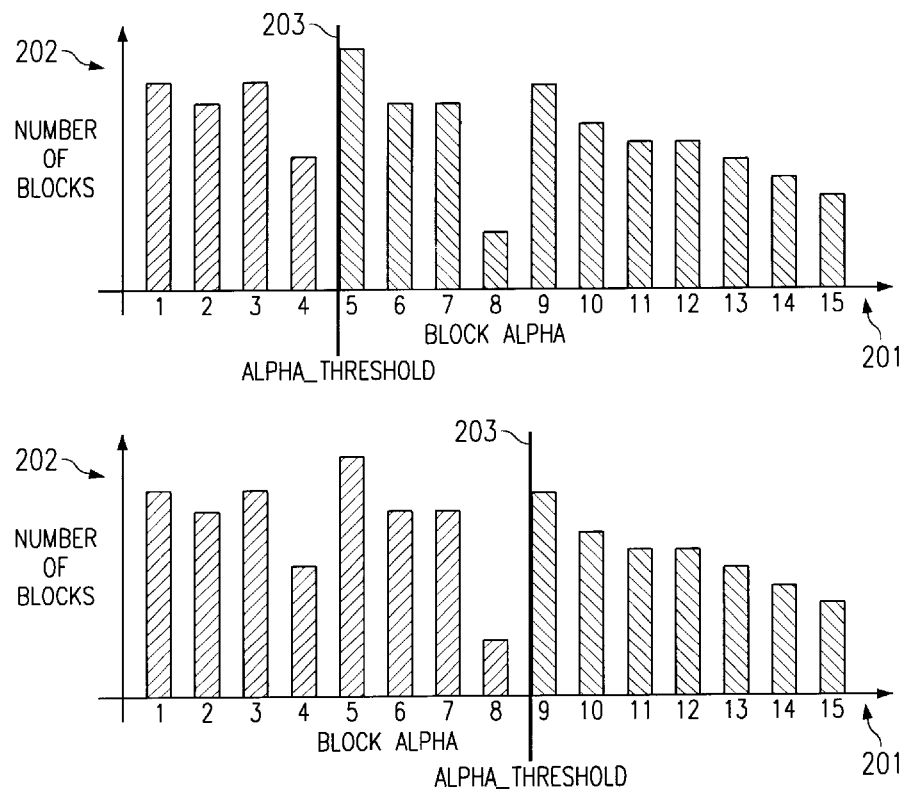
FIG. 2 illustrates one method of feedback, and the effect of changing the alpha_threshold on the compression ratio.

It can be experimentally shown that there is a wide variation in the alpha vs. compression ratio curves not only between different images, but also within a single image. It is therefore possible to generate a histogram during compression of each row of blocks as shown in FIG. 2, and then determine the required value of the alpha_threshold to attain the required compression ratio.

To generate the histogram, we maintain an array structure while processing each row of blocks. There are 15 elements in this array, with each element containing the number of non-pure solid blocks or image blocks that have a particular value of alpha. Non-pure solid blocks are those solid blocks that would have been classified as image blocks with a lower alpha_threshold. Thus, the 15 elements in the array correspond to the 15 values of block_alpha. FIG. 2 shows the 15 array elements along the horizontal axis 201, with the vertical axis 202 representing the number of blocks within each alpha value. Moving alpha_threshold 203 will increase or decrease the ratio of solid to image blocks, and thus will adjust the compression ratio to the desired value.

The basic steps in this implementation of the feedback algorithm are shown in the following pseudocode, where:

S is the size of the band to be compressed
  N is the number of rows in the band
  cum_CR is the cumulative compression ratio for the band till the row being compressed
  target_CR is the desired compression ratio for the band
  cur_targetCR is the desired compression ratio for the remaining block rows in the band being compressed
  blk_CR is the average compression ratio for a block
  cur_blk_row is the current block row number
  x is the number of non-image blocks
  K is the average compression ratio for non-image blocks
  I is the number of image blocks
  15 is the approximate compression ratio for image blocks
  50 is the approximate compression ratio for solid blocks
  T is the total number of blocks
  i is the number of image blocks converted to solid blocks
  Given the following three equations $$(S/\text{target}\_CR)=(S/N)*(cur\_blk\_row/cum\_CR)+(S/N)*(N-cur\_blk\_row)/(cur\_targetCR)$$

$$(N/\text{target}\_CR)=(cur\_blk\_row/cum\_CR)+(N-cur\_blk\_row)/cur\_targetCR cur\_targetCR=(N-cur\_blk\_row)/((N/\text{target}\_CR)-(cur\_blk\_row/cum\_CR))$$

We modify the alpha threshold if required:

If(((cur_targetCR)>cum_CR)
  OR
(1.15*cur_targetCR<cum_CR) && (cur_alpha_threshold>1)))
We recompute the alpha_threshold if cur_targetCR is greater then the cumulative compression ratio or if the cur_targetCR is less than the cumulative compression ratio by 15% or more.

$$blk\_CR = (x*K + I*15)/T$$

$$cur\_targetCR = (x*K + (I-I)*15 + I*50)/T$$

From the above two equations we derive
i=(cur_targetCR-blk_CR)(T/35.0)
The above simplification helps to reduce the computational load required to complete the algorithm:

$$i = (cur\_targetCR - blk\_CR)(T/35.0);$$

i+=number_of_non$_{13}$ pure_solid_blocks;
sum=0;
j=1;
while((sum<I) && (j<=15))
{
reqd_alpha_threshold=j;
sum+=image_alpha[j++];
}
if(abs(reqd_alpha_threshold-cur_alpha_threshold)
  <MAX_DELTA_ALPHA)
{
if(reqd_alpha_threshold>cur_alpha_threshold) cur_alpha_threshold=reqd_alpha_threshold;
else
{
if(cur_blk_row<27)cur_alpha_threshold=reqd_alpha_threshold;
}}
else
{
if(reqd_alpha_threshold>cur_alpha_threshold)
{
cur_alpha_threshold+=MAX_DELTA_THRESHOLD;
if(cur_alpha_threshold>MAX_ALPHA)cur_alpha_threshold=MAX_ALPHA;
}
else
{
if(cur_blk_row<27)cur_alpha_threshold-=MAX_DELTA_ALPHA;
if(cur_alpha_threshold<MIN_ALPHA)cur_alpha_threshold=MIN_ALPHA;
It is possible that on a very complex image the target compression ratio will not be attained using the method described. Since not attaining the required compression ratio may result in memory overflow and a fatal error during printing of the image, additional steps must be available to prevent this possibility. There are four additional algorithms that may be employed to increase the compression ratio. We may apply a non-linear companding transform to the DPCM signal, we may non-linearly compand the gray values, apply selective quantization to DPCM the signal representing darker regions, or as a last resort the entire band may be decimated.

Companding is a non-linear quantization method that preserves the smaller amplitudes of the DPCM signal at the expense of the larger amplitudes. When the quantization step size is increased, the lower levels are less effected than the higher levels. This gives an improvement in compression ratio, without causing the contouring artifacts normally seen with large quantization steps.

Figure 3A:
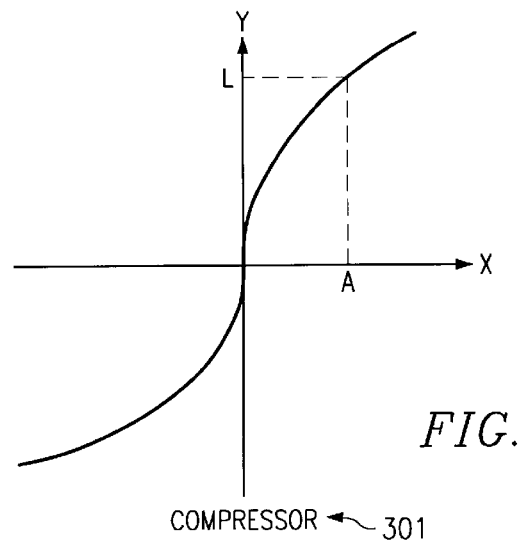
FIGS. 3A and 3B together illustrate the respective non-linear companding functions of compression and expansion.
Figure 3B:
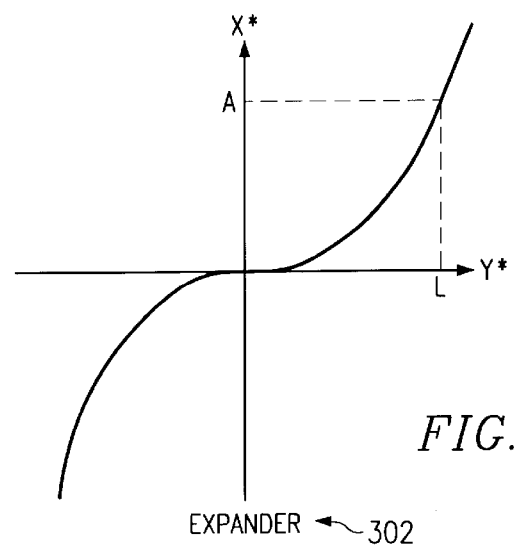

Commanders are well known in the art, and are commonly used in communication systems to improve the signal-to-noise ratio. FIGS. 3A and 3B together illustrate the transform typically used, where 301 of FIG. 3A shows the plot of the compressor, and 302 of FIG. 3B is the expander. Compression in this case is not the same as the bandwidth compression we deal with in other parts of this invention. Instead, it refers to compression and expansion of the dynamic range of a signal.

The compression function may be described with the following two equations:

$$\text{Compressor: } z = \text{trunc}(y/((L/A)*Q_{step}))$$

$$\text{Expander: } y^* = \text{trunc}(z*(L/A)*Q_{step})$$

Where
  A=the maximum amplitude of the DCPM difference signal
  L=the precision required for the compressor. Typically, L>>A L+1 is the number of entries in the Look Up Table (LUT) typically used to implement this function
  $Q_{step}$=the quantization step size
  x=the input DCPM difference signal shown in FIG. 3
  y=the output after the compression transformation
  y*=the reconstructed y after expansion
  x*=the reconstructed difference signal shown in FIG. 3
  trunc=a truncation operation Since the human eye is more sensitive to lighter shades, another approach is to apply the above companding function to the original image block instead of the DPCM signal. A look-up table can be employed that quantizes darker shades more than light areas.

A further approach that may be employed is to selectively quantize the DPCM difference signals for darker regions. Again, a look-up table may be used that quantizes different amplitudes to different degrees. As an example, gray levels 0 through max/4 could be quantized with a step size of 1, gray levels max/4 through max/2 by a step size of 2, max/2 through 3*max/4 by a step size of 3 and 3*max/4 to max with a step size of 4.

In case the required compression ratio is not reached by employing the above algorithms, the entire band must be decimated by 2:1, followed by BTC. In such a situation every block becomes an image block, and no block class information need be transmitted. This approach guarantees that the target compression ratio 16:1 can always be met.

$$\text{Compression Ratio} = (block\_size*8)/bits\_for\_Fg + bits\_for\_Bg + BTC\_bits)$$

$$\text{Compression Ratio} = (64*8)/(8+8+16) = 16$$

It has been experimentally determined that decimated bands do not visibly stand out from other bands that are not decimated. Hence, it is not necessary to decimate every band in a page when a single band requires decimation.

Figure 4:
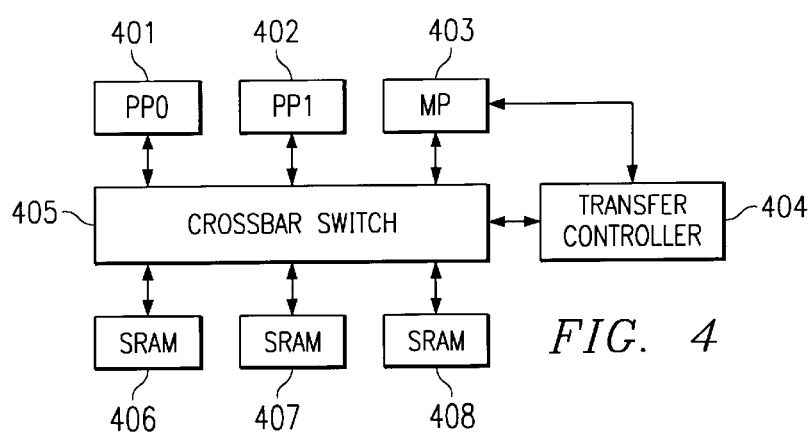
FIG. 4 is a block diagram showing the architecture of the TMS320C82 Digital Signal Processor.

The feedback compression control shown can be very efficiently implemented on a multiprocessor Digital Signal Processor (DSP) such as the Texas Instruments TMS320C82. The architecture of this DSP is shown in FIG. 4.

The TMS320C82 is a fully programmable parallel processing platform that integrates two advanced DSP cores—PP0 (401) and PP1 (402), a Reduced Instruction Set (RISC) processor 403, multiple Static Random Access Memory (SRAM) blocks 406, 407 and 408, a crossbar switch 405 that interconnects all the internal processors and memories, and a Transfer Controller (TC) 404 that controls external communications.

The hybrid compression algorithms may be implemented on the DSP cores on the TMS320C82. Each DSP has an instruction cache size of 250 instructions, and for maximum efficiency the compression and feedback software should fit within the cache to avoid the overhead of repeated cache service.

The main functional components of the software are shown below:

1. Compute BTC
2. Classify block
3. Code solid
4. Code edge (text)
5. Code image
6. VLC (variable length code) encode and format compressed stream
7. Miscellaneous overhead and control functions One method of implementation is to use the two DSP's in the TMS320C82 in a pipelined fashion. The functional components are distributed across the two processors in a way that assures that there will not be any cache misses on either of the two.

Figure 5:
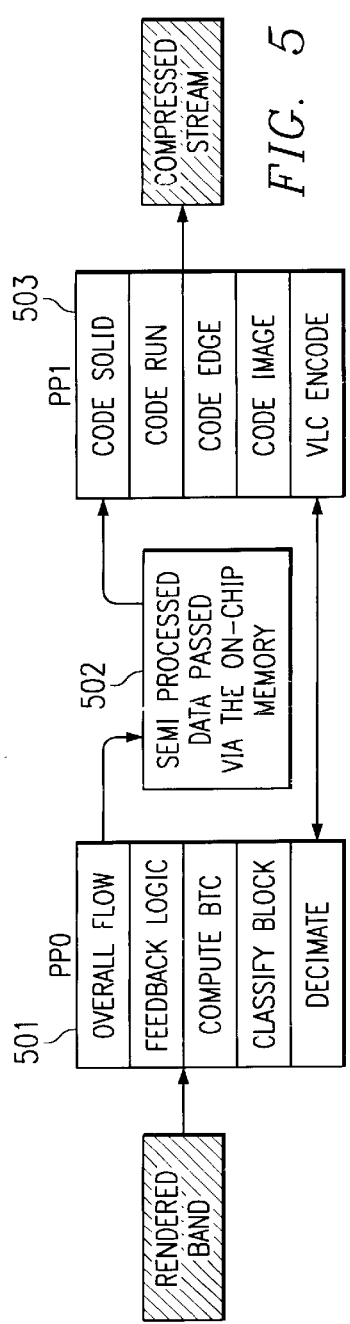
FIG. 5 shows one method of implementing the invention using the TMS320C82 processor.

This method is shown in FIG. 5. The rendered bitstream is read by PP0 501, which then performs the following computations:

1. Overall flow control
2. Feedback control logic
3. Compute BTC
4. Classify block
5. Decimate if needed The resulting intermediate output is then written into SRAM block 502. PP1 503 reads the intermediate data, and completes the following functions:

1. Code solid blocks
2. Code runs of solids
3. Code edge or text blocks
4. Code image blocks
5. VLC encode bitstream The compressed bitstream is then output to system memory. One method of scheduling the operation of the two DSP's is shown in the following table where DSP PP0 performs the tasks of the top line and DSP PP1 performs the tasks of the bottom line:

| Render band 0 | Compress band 0 | Render band 1 | Compress band 1 |
| Idle | Compress band 0 | Idle | Compress band 1 |

It is also possible to perform the complete operation on a single DSP. In this case we will assume that the entire software module will not fit into the instruction cache, and therefore there will be some cache misses. The following method is designed to minimize the cache miss overhead.

We know from experimental data that all the classes of blocks do not occur equally well distributed over a page. This is particularly pronounced for image blocks. Within a region or band the following class groups are likely to occur with a higher probability than a sequence of blocks with a random sequence of classes:

1. Solids and Runs
2. Solids, Runs and Images
3. Solids, Runs and Saturated Edges
4. Solids, Runs and Edges Based on the above statistics, we can construct the following subsets of functional components of the software in such a way that each group will fit into the instruction cache:

SET 1
1. Compute BTC
2. Classify block
3. Code Solid
4. Code Run
5. Code Image
6. VLC encode SET 2
1. Compute BTC
2. Classify block
3. Code Solid
4. Code Run
5. Code Edge
6. VLC encode SET 3
1. Compute BTC
2. Classify block
3. Code Solid
4. Code Run
5. Code Saturated Edge
6. VLC encode The TMS320C82 overwrites the Least Recently Used (LRU) block of code in the instruction cache when a cache miss occurs. The algorithm can keep track of the functional components resident in the cache. Whenever it detects that a cache miss is going to occur, it can assure that only the function block not currently required will be overwritten with the new function.

Figure 6:
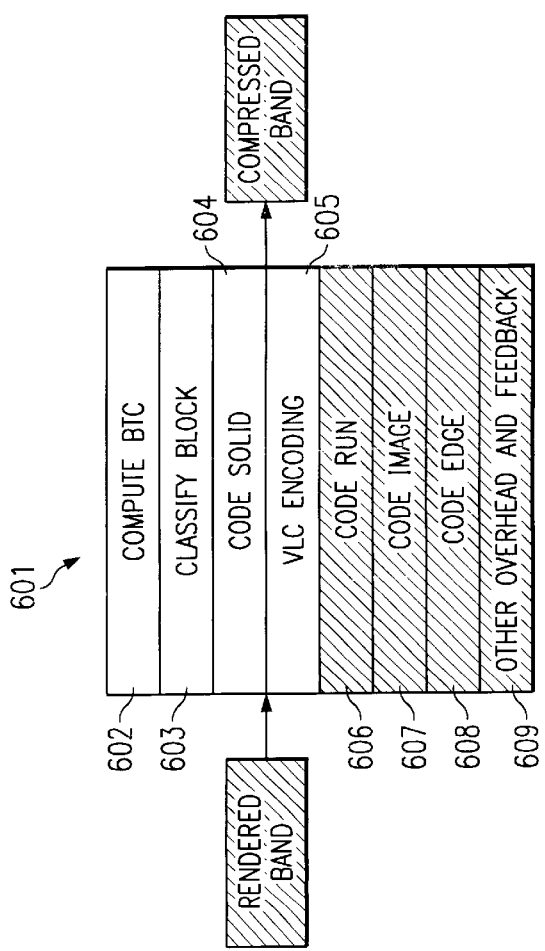
FIG. 6 demonstrates an alternate method of implementation

FIG. 6 shows this method of memory management. Cache memory block 601 is organized as multiple segments. Software functional components 602, 603, 604 and 605 are required by all the blocks, and therefore are maintained in the cache at all times. Functions 606, 607, 608 and 609 are selected and brought into the cache memory only as needed.

The TMS320C82 processor has the capability of reconfiguring the 32 bit ALU into two 16 bit or four 8 bit ALU's. Since the input in this case is 8 bit wide, this feature can be used very effectively to increase throughput of the system.

As an example, calculating the block_Mean involves calculating the average of 64 bytes (8×8 block). Using the conventional approach, this requires 64 additions and 1 division. Using the 16 bit split ALU feature, this can be reduced to 32 additions and 1 division, with the divide by 64 being a simple right shift by 6.

Figure 7:
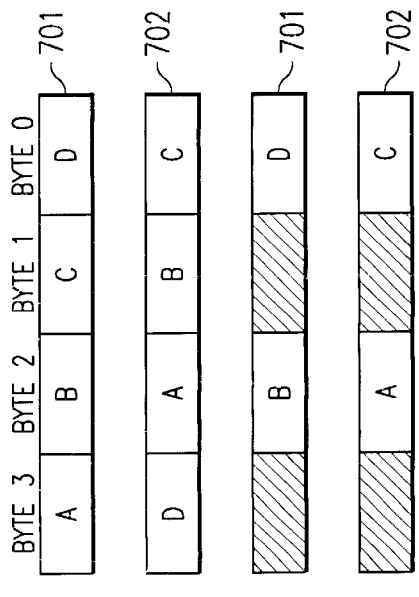
FIG. 7 shows the data flow when calculating the block_Mean.

FIG. 7 shows the data flow when using the split ALU feature in the calculation of the block_Mean. 32 bit register 701 contains the 4 bytes to be processed. Register 702 contains the same data, rotated right by 8 bits. After masking bytes 1 and 3 in registers 701 and 702, bytes B and D can be accumulated in the corresponding half words in the accumulator in one clock cycle. In the next cycle, bytes A and C can be accumulated. After this processing for all 16 words (64 bytes) is complete, the 2 resultant 16 bit half words in the 32 bit accumulator can be added to get the required sum of all 64 bytes in the block. The computation can then be completed by right shifting the accumulator 6 bit positions, giving the block_Mean.

The 8-bit split ALU feature of the TMS320C82 also allows a very efficient method to generate the block_BTC. The previously computed block_Mean is replicated 4 times in a 32-bit register to occupy all 4 byte positions. Now, in a single instruction 4 bytes of the input data can be subtracted from the replicated mean register, resulting in 4 separate carry bits getting appropriately updated. The 4 carry bits represent the 4 bits of BTC data. This is shown graphically in the following tables, with a mean value of 80 as an example, and 100, 64, 72 and 94 as example data points. After subtraction, the 4-bit carry register contains the resulting BTC value.

| Byte 3 | Byte 2 | Byte 1 | Byte 0 |
|--------|--------|--------|--------|
| 80     | 80     | 80     | 80     |
| 100    | 64     | 72     | 94     |
| 1      | 0      | 0      | 1      |

Although the present invention has been described in detail, it should be understood that various changes, substitutions and alterations may be made to the embodiments described herein without departing from the spirit and scope of the invention

What is claimed is:

1. A method for adaptively controlling the compression of a bitmap image to guarantee the attainment of a predetermined compression ratio comprising the steps of:
   partitioning said bitmap image into blocks;
   classifying each block according to image content;
   compressing each block by an algorithm selected to be most efficient for the class of the block;
   during compression, comparing the actual attained compression ratio to the target compression ratio and generating an error signal if the target compression ratio has not been attained, where this comparing may be done on a block, row of blocks or page basis and the resultant error signal is used to adjust the compression ratio for subsequent blocks; and
   adjusting the compression ratio by changing a block classification threshold in response to said error signal, where compression is increased by shifting the block classification threshold to increase the number of blocks classified as SOLID, and is decreased by increasing the number of blocks classified as IMAGE.

2. The method of claim 1, wherein:
the compressing and comparing steps are implemented on a Digital Signal Processor comprising of multiple processing elements, with the processing functions segmented between the available processors, and scheduled to execute in a pipelined fashion.

3. The method of claim 1, wherein:
the compressing and the comparing steps are executed via algorithms on a single Digital Signal Processor; and
the core functions of the said algorithms are grouped in a way that will minimize the occurrence of cache misses and the resulting overhead and where the grouping of the functions is determined by statistically analyzing the frequency of occurrence of the various image content classes of the blocks in the original bitmap image.

4. A method of adaptively controlling the compression of a bitmap image to guarantee the attainment of a predetermined target compression ratio comprising the steps of:
   partitioning the bitmap image into blocks;
   classifying each block according to image content type, said step of classifying each block according to image content type including
      determining the alpha of each block as the average absolute variation from the mean of the pixels within the block,
      selecting an alpha threshold,
      classifying a block as SOLID if the alpha of the block is less than the alpha threshold, and
      classifying a block as IMAGE if the alpha of the block is greater than the alpha threshold;
   compressing each block by an algorithm selected to be most efficient for the image content type of the block;
   comparing an actual attained compression ratio to the target compression ratio; and
   adjusting the compression ratio for subsequent blocks corresponding to the relationship of the actual attained compression ratio and the target compression ratio, said step of adjusting the compression ratio for subsequent blocks including
      increasing the alpha threshold thereby shifting the block classification to increase the number of blocks classified as SOLID if the actual attained compression ratio is less than the target compression ratio, and
      decreasing the alpha threshold thereby shifting the block classification to increase the number of blocks classified as IMAGE if the actual attained compression ratio is greater than the target compression ratio.

5. The method of claim 4, wherein:
said step of adjusting the compression ratio for subsequent blocks further includes
   defining a delta alpha threshold amount,
   said step of increasing the alpha threshold increases the alpha threshold by the delta alpha threshold amount, and
   said step of decreasing the alpha threshold decreases the alpha threshold by half the delta threshold amount.

6. The method of claim 4, wherein:
said step of adjusting the compression ratio for subsequent blocks further includes
   defining a maximum alpha threshold,
   defining a minimum alpha threshold,
   said step of increasing the alpha threshold increases the alpha threshold up to but not greater than the maximum alpha amount, and
   said step of decreasing the alpha threshold decreases the alpha threshold down to but not less than the minimum alpha amount.

7. The method of claim 6, wherein:
said step of adjusting the compression ratio for subsequent blocks further includes non-linearly quantizing data of at least one block subject to digital pulse code modulation using a companding function if the alpha threshold has been increases up the maximum alpha amount and the actual attained compression ratio is less than the target compression ratio.

8. The method of claim 6, wherein:

said step of adjusting the compression ratio for subsequent blocks further includes non-linearly quantizing bitmap data of at least one block using a companding function if the alpha threshold has been increases up the maximum alpha amount and the actual attained compression ratio is less than the target compression ratio.

9. The method of claim 6, wherein:

said step of adjusting the compression ratio for subsequent blocks further includes selectively quantizing data of at least one block subject to digital pulse code modulation having smaller quantization steps for data corresponding to lighter shades than for data corresponding to darker shades if the alpha threshold has been increases up the maximum alpha amount and the actual attained compression ratio is less than the target compression ratio.

10. The method of claim 6, wherein:

said step of adjusting the compression ratio for subsequent blocks further decimates data of all blocks if the alpha threshold has been increases up the maximum alpha amount and the actual attained compression ratio is less than the target compression ratio.

11. The method of claim 4, wherein:

said step of classifying each block according to image content type classifies each block as one of SOLID, TEXT or IMAGE;

said step of compressing each block by an algorithm selected to be most efficient for the image content type of the block
  compresses SOLID blocks by differential pulse code modulation,
  compresses TEXT blocks by block truncation coding, and
  compresses IMAGE blocks by at least one of differential pulse code modulation, discrete cosine transform coding and block truncation coding.

12. The method of claim 4, wherein:

the method is partitioned into an overall flow control module, a feedback control logic module, a computation of block truncation coding module, an image block classification module and a decimation module executable on a first digital signal processor and a code solid block module, a code runs of solid blocks module, a code edge and text blocks module, a code image blocks module and a variable length encoding module executable on a second digital signal processor operating in a pipeline fashion with said first digital signal processor.

13. The method of claim 4, wherein:

the method is partitioned into a first set of modules including a computation of block truncation coding module, an image block classification module, a code solid block module and a variable length coding module stored within an instruction cache of a digital signal processor and a second set of modules including a code runs of solid blocks module, a code image blocks module, a code edge and text blocks module and an overall flow control module and feedback control logic module, one of said second set of modules selectively stored in said instruction cache of said digital signal processor as needed.

* * * * *